US010908347B2

(12) United States Patent
Daikoku

(10) Patent No.: US 10,908,347 B2
(45) Date of Patent: Feb. 2, 2021

(54) LIGHT GUIDE BODY AGGREGATE SUBSTRATE AND PRODUCTION METHOD FOR INTEGRATED LIGHT-EMITTING DEVICE

(71) Applicant: NICHIA CORPORATION, Anan (JP)

(72) Inventor: Shinichi Daikoku, Tokushima (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 16/855,064

(22) Filed: Apr. 22, 2020

(65) Prior Publication Data

US 2020/0341185 A1 Oct. 29, 2020

(30) Foreign Application Priority Data

Apr. 26, 2019 (JP) ................. 2019-085406

(51) Int. Cl.
*F21V 8/00* (2006.01)
*G02F 1/13357* (2006.01)
*G02F 1/1335* (2006.01)

(52) U.S. Cl.
CPC ......... *G02B 6/0065* (2013.01); *G02B 6/0073* (2013.01); *G02B 6/0078* (2013.01); *G02F 1/133524* (2013.01); *G02F 1/133603* (2013.01); *G02F 1/133606* (2013.01)

(58) Field of Classification Search
CPC ... G02B 6/0065; G02B 6/0073; G02B 6/0078
See application file for complete search history.

(56) References Cited

U.S. PATENT DOCUMENTS

2018/0239193 A1 8/2018 Hayashi
2019/0103534 A1 4/2019 Sato

FOREIGN PATENT DOCUMENTS

| JP | 2007-168401 A | 7/2007 |
| JP | 2009-076524 A | 4/2009 |
| JP | 2013-039827 A | 2/2013 |
| JP | 2014-106241 A | 6/2014 |
| JP | 2014-160201 A | 9/2014 |
| JP | 2018-133304 A | 8/2018 |
| JP | 2019-067904 A | 4/2019 |

*Primary Examiner* — Robert J May
(74) *Attorney, Agent, or Firm* — Foley & Lardner LLP

(57) ABSTRACT

A light guide body aggregate substrate includes: a light-transmitting substrate having a main surface; a plurality of unit regions, wherein the plurality of unit regions are arranged one-dimensionally in one row extending in a first direction and a plurality of columns, or two-dimensionally in a plurality of rows extending in the first direction and a plurality of columns extending in a second direction, and wherein a light guide structure is located in each unit region; a marginal region; and a plurality of first alignment marks arranged in the first direction on the substrate in the marginal region, each first alignment mark being disposed at a position corresponding to a position in the first direction of a corresponding one of the plurality of columns of the plurality of unit regions extending in the second direction.

20 Claims, 11 Drawing Sheets

LIGHT GUIDE BODY AGGREGATE SUBSTRATE AND PRODUCTION METHOD FOR INTEGRATED LIGHT-EMITTING DEVICE

CROSS-REFERENCE TO RELATED APPLICATION

This application claims priority to Japanese Patent Application No. 2019-085406, filed on Apr. 26, 2019, the disclosure of which is hereby incorporated by reference in its entirety.

BACKGROUND

The present disclosure relates to light guide body aggregate substrates and production methods for integrated light-emitting devices.

A light-emitting device including light-emitting elements such as light-emitting diodes is widely used as a backlight for a display such as a liquid crystal display apparatus. In particular, a direct-lit backlight is employed in order to increase the luminance of a display, or increase the contrast of an image by performing partial drive.

In some recent applications, the thickness of a display equipped with a direct-lit backlight is required to be reduced to the extent possible. Therefore, the thickness of the direct-lit backlight may also be required to be reduced to the extent possible. For example, Japanese Patent Publication No. 2018-133304 discloses an integrated light-emitting device in which lenses for diffusing light are provided on a light guide plate, and light-emitting elements are joined to the light guide plate. Such a configuration can provide a thinner integrated light-emitting device.

SUMMARY

In some cases, in such an integrated light-emitting device in which light-emitting elements are joined to a light guide plate, the influence of expansion of the light guide plate due to a thermal treatment in the production process is required to be reduced. The present disclosure provides an integrated light-emitting device in which the influence of expansion of the light guide plate due to a thermal treatment in the production process is reduced, and a production method therefor.

A light guide body aggregate substrate according to an embodiment of the present disclosure includes: a light-transmitting substrate having a main surface; a plurality of unit regions disposed on the main surface of the substrate, arranged one dimensionally in one row extending in a first direction and a plurality of columns, or arranged two-dimensionally in a plurality of rows extending in the first direction and a plurality of columns extending in a second direction, and spaced apart from each other, each unit region having a light guide structure; a marginal region located on the main surface of the substrate, surrounding each of the plurality of unit regions; and a plurality of first alignment marks arranged in the first direction on the substrate in the marginal region, each first alignment mark being disposed at a position corresponding to a position in the first direction of a corresponding one of the plurality of columns of the plurality of unit regions extending in the second direction.

A method for producing an integrated light-emitting device according to an embodiment of the present disclosure includes: preparing the above light guide body aggregate substrate; disposing a plurality of light sources (a plurality of groups of light-emitting elements), corresponding to the plurality of unit regions, each light source including one or more light-emitting elements, and each light source being disposed for a corresponding one of the plurality of unit regions so that light emitted from the one or more light-emitting elements enters the light guide structure; and cutting the substrate in the second direction, with reference to a position of each of the plurality of first alignment marks, in the marginal region between a corresponding pair of adjacent ones of the plurality of columns of the plurality of unit regions.

According to certain embodiments of the present disclosure, an integrated light-emitting device is obtained in which the influence of expansion of a light guide plate due to a thermal treatment in a production process is reduced.

DETAILED DESCRIPTION

Figure 1A:
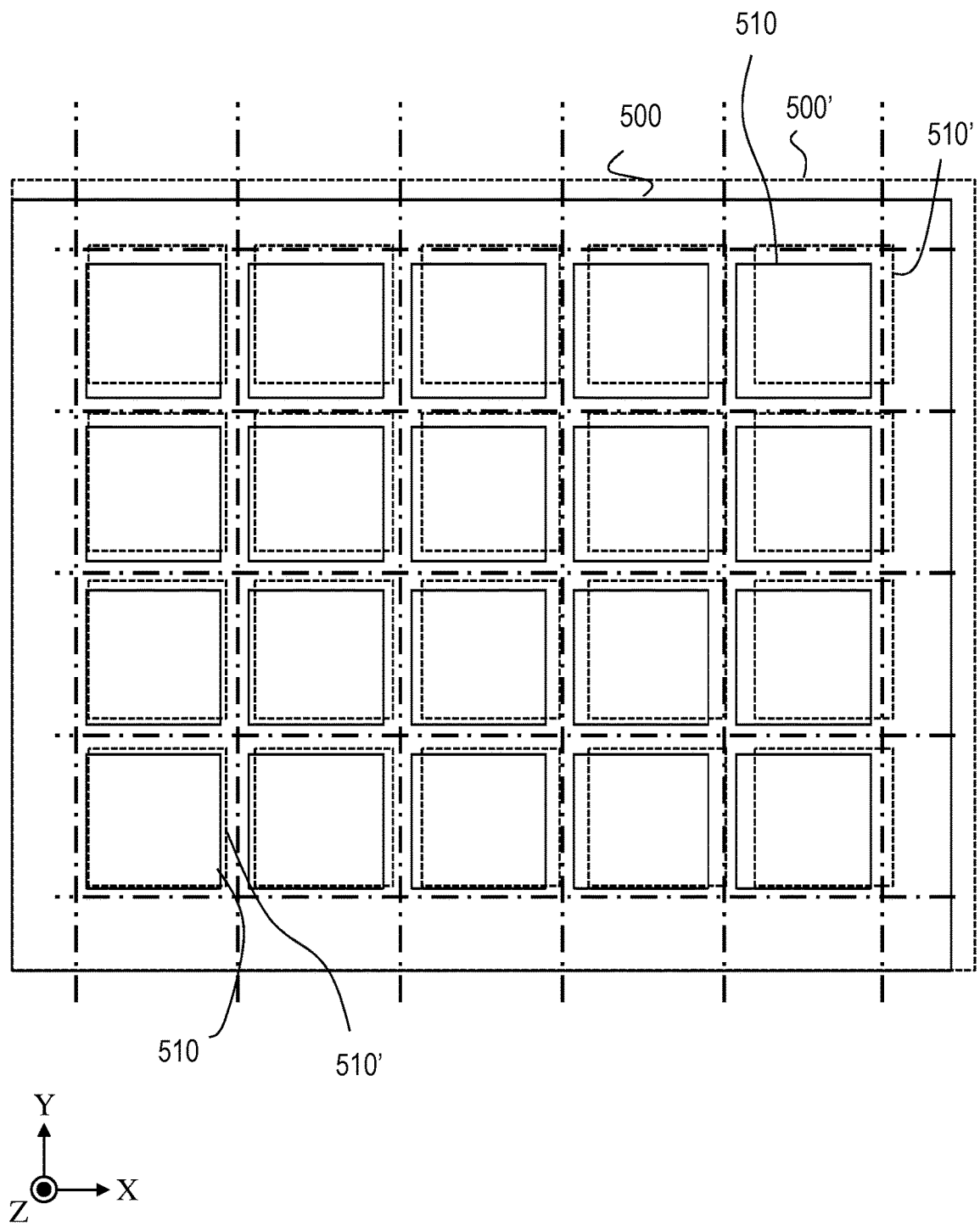
FIG. 1A is a schematic diagram for describing how the position of a region 510 of a light guide body aggregate substrate in which an integrated light-emitting device is to be formed deviates due to a thermal treatment.

When an integrated light-emitting device in which light-emitting elements are joined to a light guide plate (such as that disclosed in Japanese Patent Publication No. 2018-133304) is used as a direct-lit backlight for a display, a single such integrated light-emitting device that has a size corresponding to the screen of the display may be used, for example. In that case, it is necessary to arrange and join a large number of light-emitting elements on a single light guide plate having a size corresponding to the screen. Therefore, for example, even if just one of the light-emitting elements on the single light guide plate does not properly work or is not disposed at an appropriate position, the integrated light-emitting device as a whole may be defective, and the manufacturing yield may be reduced.

In order to circumvent such a reduction in the manufacturing yield, the screen of a display may be divided into a plurality of regions, a plurality of integrated light-emitting devices each having a size corresponding to the region may be produced, and the plurality of integrated light-emitting device may be disposed. For example, initially, a plurality of light-emitting elements are arranged and joined on a light guide plate with a side several centimeters long, to produce a small integrated light-emitting device. Thereafter, a plurality of such small integrated light-emitting devices are two-dimensionally disposed. The resultant structure as a whole can be used as a backlight suitable for a large screen.

The number of light-emitting elements joined to such a small integrated light-emitting device is smaller than when light-emitting elements are arranged and joined on a light guide plate having a size corresponding to the entire screen, and therefore, the small integrated light-emitting device can be manufactured at a higher yield. In addition, various displays having different screen sizes can be produced using different numbers of small integrated light-emitting devices disposed, and can be manufactured at lower cost than when integrated light-emitting devices having light guide plates having different sizes corresponding to different screen sizes are prepared.

In the case of production of a small integrated light-emitting device, a plurality of small integrated light-emitting devices are preferably produced in the same process in order to improve manufacturing efficiency and reduce manufacturing cost. Specifically, an aggregate of a plurality of small integrated light-emitting devices is produced using a single aggregate substrate, and thereafter, the aggregate substrate is cut into pieces, i.e., diced, to produce a plurality of small integrated light-emitting devices. According to this method, even if there is one defective light-emitting element in the aggregate of small integrated light-emitting devices, only one of the small integrated light-emitting devices that includes that defective light-emitting element is defective. Therefore, the manufacturing yield can be maintained high compared to when a single integrated light-emitting device having a size corresponding to the screen size is produced as described above.

However, when producing small integrated light-emitting devices using such a production method, the aggregate substrate is exposed to heat in the production process when the light-emitting elements are joined to the aggregate substrate and when a reflective member is formed, so that the aggregate substrate expands or contracts. As a result, a position where the aggregate substrate is cut deviates. For example, as shown in FIG. 1A, it is assumed that regions 510, in each of which an integrated light-emitting device is to be formed, are disposed in four rows and five columns on a light guide body aggregate substrate (or light guide plate aggregate substrate) 500. When light-emitting elements are joined or a reflective member is formed on the light guide body aggregate substrate 500, the light guide body aggregate substrate 500 is subjected to a thermal treatment, so that the light guide body aggregate substrate 500 expands to become a light guide body aggregate substrate 500'. Regions 510', in each of which an integrated light-emitting device is formed on the light guide body aggregate substrate 500', move due to expansion of the light guide body aggregate substrate 500'.

Figure 1B:
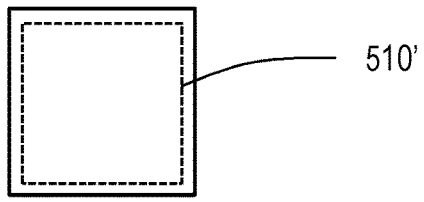
FIG. 1B is a schematic diagram showing the position of a region 510' in a piece that is close to the origin in the case in which a light guide body aggregate substrate that has expanded is cut into pieces.
Figure 1C:
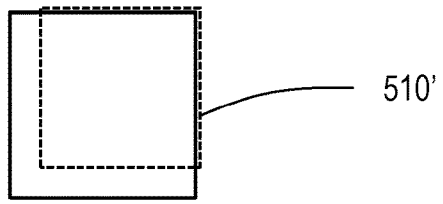
FIG. 1C is a schematic diagram showing the position of a region 510' in a piece that is far from the origin in the case in which a light guide body aggregate substrate that has expanded is cut into pieces.

As shown in FIG. 1A, an X axis and a Y axis are provided, and one of the four vertices of each of the light guide body aggregate substrates 500 and 500' is disposed at the origin of the coordinate system. As shown in FIG. 1A, the deviation of the position of a region 510' on the light guide body aggregate substrate 500' from the position of the corresponding region 510 on the light guide body aggregate substrate 500 becomes gradually more significant as the distance from the origin increases. Therefore, when the light guide body aggregate substrate 500' is cut into pieces, i.e., the individual regions 510', at the pitch of the regions 510 on the light guide body aggregate substrate 500 (i.e., at positions indicated by dash-dot lines in FIG. 1A), the region 510' of the light guide body aggregate substrate 500' closest to the origin is disposed at the center of the piece almost exactly as designed as shown FIG. 1B, and the region 510' of the light guide body aggregate substrate 500' furthest from the origin significantly deviates from the center of the piece as shown in FIG. 1C.

With the above problem in mind, the present inventor has conceived of a novel light guide body aggregate substrate and production method for an integrated light-emitting device. Embodiments of the present disclosure will now be described with reference to the accompanying drawings. The following embodiments are illustrative, and the light guide body aggregate substrate and production method for an integrated light-emitting device of the present disclosure are not limited thereto. For example, the numerical values, shapes, materials, steps, and the order of the steps, etc., indicated in the following embodiments are merely illustrative, and various modifications can be made thereto unless a technical contradiction occurs. The embodiments below are merely illustrative and can be used in various combinations unless a technical contradiction occurs.

The dimensions, shapes, etc., of elements shown in the drawings may be exaggerated for clarity. The dimensions, shapes, etc., of the elements of the light-emitting module are not necessarily drawn to scale, e.g., the dimensions of some of the elements of the light-emitting module relative to the other elements may be exaggerated. Some of the elements may not be shown, in order to avoid unnecessarily obfuscating the drawings.

In the description that follows, elements of like functions may be denoted by like reference signs and may not be described redundantly. Terms indicating specific directions and positions (e.g., "upper," "lower," "right," "left," and other terms including such terms) may be hereinafter used. Note however that these terms are only used for clarity of illustration to refer to relative directions and positions in the drawings to which reference is made. When applied to drawings, actual products, actual manufacturing apparatuses, etc., other than those of the present disclosure, the elements need not have the same arrangement as that shown in the drawings to which reference is made, as long as the elements have the same directions and positions relative to each other that are indicated by the terms such as "upper" and "lower" in the drawings to which reference is made. As used herein, the term "parallel" with respect to two straight lines, sides, planes, etc., is intended to encompass some deviations from absolute parallelism (0°) that are in the range of about ±5° unless otherwise specified. As used herein, the term "perpendicular" or "orthogonal" with respect to two straight lines, sides, planes, etc., is intended (Structure of Integrated Light-Emitting Device)

Figure 2:
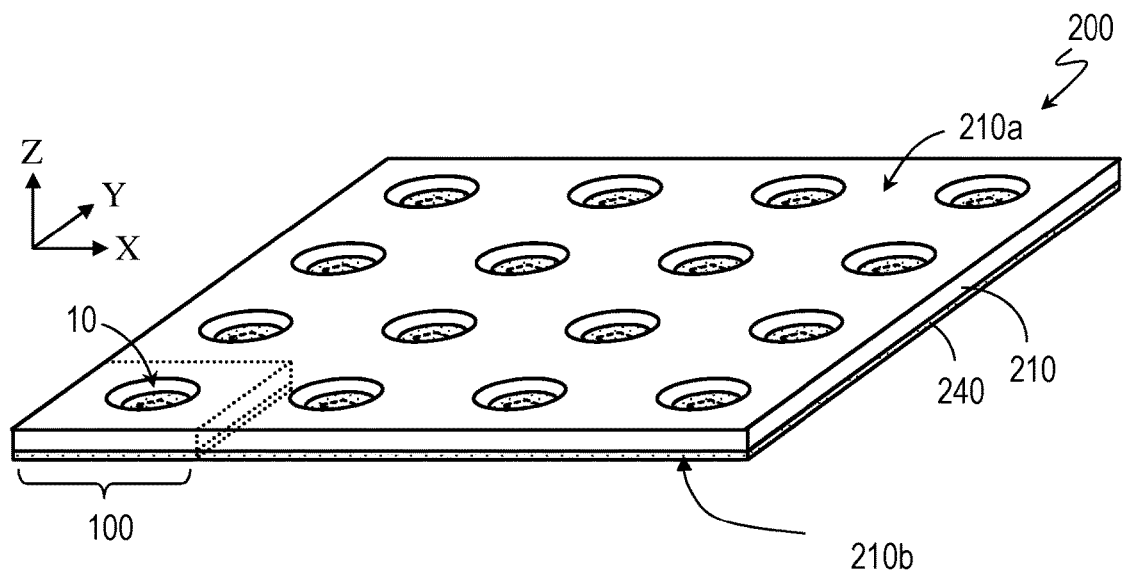
FIG. 2 is a perspective view showing an example integrated light-emitting device.

Firstly, an integrated light-emitting device that is produced using a light guide body aggregate substrate according to the present disclosure will be described. FIG. 2 shows an illustrative configuration of an integrated light-emitting device according to an embodiment of the present disclosure. The integrated light-emitting device 200 of FIG. 2 includes a light guide body 210 having an upper surface 210a, and a layer-shaped light reflective layer 240 located on a lower surface 210b of the light guide body 210. Note that FIG. 2 additionally shows arrows indicating an X direction, Y direction, and Z direction that are orthogonal to each other for the sake of convenience. In some of the other figures of the present disclosure, arrows indicating these directions are also shown. The X and Y directions are also a first and a second direction.

The integrated light-emitting device 200 is in the shape of a plate as a whole. The light guide body 210 has a light guide structure in which light emitted from a plurality of light-emitting elements disposed on the lower surface 210b is emitted from the upper surface 210a. The upper surface 210a is a light emission surface of the integrated light-emitting device 200. The upper surface 210a of the light guide body 210 typically has a rectangular shape. Here, the X and Y directions coincide with one and the other, respectively, of the orthogonal sides of the rectangular shape of the light guide body 210. The lengths of the sides of the rectangular shape of the upper surface 210a are in the range of, for example, 1-200 cm. In a typical embodiment of the present disclosure, the lengths of the sides of the rectangular shape of the upper surface 210a of the light guide body 210 are 10-30 mm. The lengths in the lengthwise and widthwise directions of the upper surface 210a may be, for example, about 24.3 mm and 21.5 mm, respectively.

In the configuration illustrated in FIG. 2, the integrated light-emitting device 200 includes an aggregate of light-emitting modules 100 each including at least one light-emitting element. In this example, as schematically shown in FIG. 2, the integrated light-emitting device 200 includes a total of 16 light-emitting modules 100 arranged two-dimensionally. Here, the 16 light-emitting modules 100 are arranged in a matrix of four rows and four columns. The number and arrangement of the light-emitting modules 100 included in the integrated light-emitting device 200 are not particularly limited, and are not limited to the example of FIG. 2.

As shown in FIG. 2, each light-emitting module 100 has a first hole 10 that has, as a part thereof, an opening located on the upper surface 210a of the light guide body 210. As specifically described below, the light-emitting element of each light-emitting module 100 is disposed substantially directly below the first hole 10. In this example, the light-emitting elements are arranged in a matrix of four rows and four columns extending in the X and Y directions, corresponding to the arrangement of the light-emitting modules 100 in a matrix of four rows and four columns. The arrangement pitch of the light-emitting elements may be, for example, about 0.05-20 mm, and may be in the range of about 1-10 mm. As used herein, the arrangement pitch of the light-emitting elements refers to the distance between the optical axes of the successive light-emitting elements. The light-emitting elements are spaced either equally or unequally. The arrangement pitches in two different directions of the light-emitting elements may be either the same or different.

Figure 3:
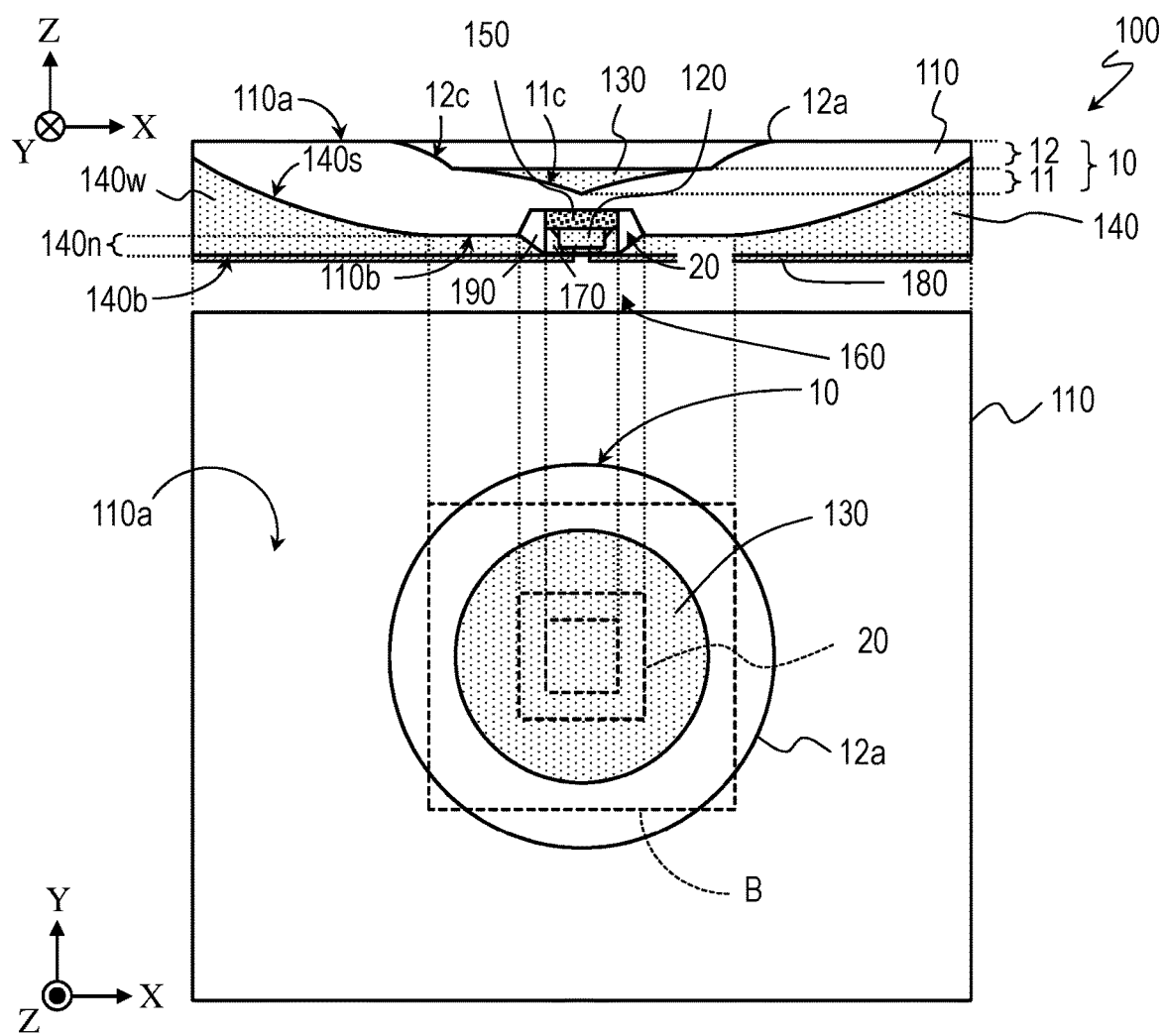
FIG. 3 is a cross-sectional view and top view of one light-emitting module included in an integrated light-emitting device.

FIG. 3 shows the light-emitting module 100. FIG. 3 schematically shows a cross-section of the light-emitting module 100 taken perpendicular to the upper surface 210a of the light guide body 210 at or near the center of the light-emitting module 100, and an illustrative appearance of the light-emitting module 100 as viewed from the upper surface 210a of the light guide body 210 in a direction perpendicular to the upper surface 210a.

The light-emitting module 100 includes: a light guide body 110 having an upper surface 110a in which the first hole 10 is provided, and a lower surface 110b located on the opposite side from the upper surface 110a; a light source 160 including a light-emitting element 120; and a reflective resin layer 130 located in the first hole 10. The light guide body 110 is a part of the light guide body 210 shown in FIG. 2, and the first hole 10 of the light guide body 110 is one of the plurality of first holes 10 shown in FIG. 2. Note that the light guide body 110 may be formed of a single light guide plate continuous between two adjacent light-emitting modules 100 in the integrated light-emitting device 200. Note that, for example, each light-emitting module 100 may have a separate light guide body 110, and a clear boundary may be observed between the light guide bodies 110 of two light-emitting modules 100 in the integrated light-emitting device 200.

In the configuration illustrated in FIG. 3, the light-emitting module 100 further has a light reflective member 140 located on the lower surface 110b of the light guide body 110. The light reflective member 140 is a part of the light reflective layer 240 shown in FIG. 2. In this example, the light reflective member 140 includes a layer-shaped base portion 140n, and a wall portion 140w raised from the lower surface 110b of the light guide body 110 toward the upper surface 110a. An outermost rectangle B of the dashed-line rectangles shown in a lower portion of FIG. 2 indicates an inner periphery of the wall portion 140w. Although the inner periphery of the wall portion 140w here has a rectangular shape as an example, the inner periphery of the wall portion 140w may have other shapes, such as circular and elliptical. As with the light guide body 110, the light reflective member 140 may be formed continuously across two adjacent light-emitting modules 100 in the integrated light-emitting device 200.

The first hole 10 of the light guide body 110 is formed at or near the center of the upper surface 110a. Here, the first hole 10 has a first portion 11 having a first side surface 11c sloped with respect to the upper surface 110a, and a second portion 12 having a second side surface 12c sloped with respect to the upper surface 110a. As shown in FIG. 3, the second side surface 12c of the second portion 12 is a portion of one or more side surfaces defining the shape of the first hole 10 that is located between an opening 12a located on the upper surface 110a of the light guide body 110 and the first side surface 11c of the first portion 11. The magnitude of the slope of the first side surface 11c with respect to the upper surface 110a is different from the magnitude of the slope of the second side surface 12c with respect to the upper surface 110a. In this example, the first portion 11 of the first hole 10 has a generally inverted conical shape, and the second portion 12 of the first hole 10 has an inverted truncated conical shape. The first hole 10 functions as a lens that controls the direction in which light is emitted, by utilizing the refraction of light at the boundary between the inner surface of the hole and the external environment.

In the light-emitting module 100, the light source 160 is disposed on the lower surface 110b of the light guide body 110, facing the first hole 10 provided on the upper surface 110a of the light guide body 110. In the example shown in FIG. 3, a second hole 20 is provided on the lower surface 110b of the light guide body 110, and the light source 160 is located inside the second hole 20 as viewed from above. The optical axis of the light source 160 substantially coincides with the center of the first hole 10, i.e., the light source 160 and the first hole 10 are substantially concentric or coaxial.

As described above, the reflective resin layer 130 of each light-emitting module 100 is located in the first hole 10. In this embodiment, the reflective resin layer 130 is located in the first portion 11 of the first hole 10, which is closer to the light-emitting element 120. In this example, the reflective resin layer 130 is formed in the first hole 10, occupying the entire first portion 11.

The reflective resin layer 130 is formed of a light reflective material. By locating the first hole 10 in the light guide body 110, facing the light-emitting element 120, light emitted from the light-emitting element 120 is allowed to be reflected on the side surfaces defining the shape of the first hole 10. In particular, in the embodiment of the present disclosure, the first hole 10 including the first portion 11 having the first side surface 11c and the second portion 12 having the second side surface 12c is provided on the upper surface 110a of the light guide body 110. Therefore, by utilizing the first side surface 11c and the second side surface 12c, which are sloped at different angles with respect to the upper surface 110a, as a reflective surface, light emitted from the light-emitting element 120 is allowed to be more efficiently diffused in the light guide body 110, particularly along the upper and lower surfaces 110a and 110b. Furthermore, the reflective resin layer 130 is disposed, facing the light-emitting element 120, and therefore, the luminance of a portion of the upper surface 110a of the light guide body 110 that is located directly above the light-emitting element 120 can be substantially prevented from being extremely higher than the luminance of the other regions. Here, the reflective resin layer 130 is formed selectively in the first portion 11 of the first hole 10, and therefore, the luminance of such a portion located directly above the light-emitting element 120 can be substantially prevented from being unnecessarily reduced. As a result, more uniform light can be obtained while the overall thickness of the light-emitting module 100 is reduced.

The light guide body 110 has the second hole 20 that is located on the lower surface 110b, facing the first hole 10. The second hole 20 has, for example, a truncated quadrilateral pyramidal shape. Typically, the center of the second hole 20 located on the lower surface 110b of the light guide body 110 substantially coincides with the center of the first hole 10 located on the upper surface 110a of the light guide body 110, i.e., the first and second holes 10 and 20 are substantially concentric or coaxial.

The light source 160 includes the light-emitting element 120, a wavelength conversion member 150, and a light reflective member 170. The wavelength conversion member 150 is joined to a light emission surface of the light-emitting element 120, and the light reflective member 170 is disposed on a side surface of the light-emitting element 120 and a surface of the light-emitting element 120 on the opposite side from the light emission surface. The wavelength conversion member 150 is located at a bottom portion of the second hole 20 as viewed from the lower surface 110b, and therefore, light emitted from the light-emitting element 120 is transmitted through the wavelength conversion member 150, and enters the light guide body 110, which has a light guide structure. A bonding member 190 is disposed in the second hole 20, covering side surfaces of the wavelength conversion member 150 and the light reflective member 170.

The light-emitting module 100 further has an interconnection layer 180 located on a lower surface 140b of the light reflective member 140. The interconnection layer 180 is electrically coupled to an electrode of the light-emitting element 120. The interconnection layer 180 is also optionally electrically coupled to electrodes of a plurality of light-emitting elements 120 disposed in a unit region.

In this embodiment, the light source 160 includes a single light-emitting element. Alternatively, the light source 160 may include a plurality of light-emitting elements. The light source 160 typically emits white light. In this embodiment, the light-emitting element 120 is, for example, a light-emitting diode that emits blue light, and a part of the emitted blue light is converted into yellow light by the wavelength conversion member 150. Blue light and yellow light emitted by the light source 160 together form white light. Alternatively, the light source 160 may include, for example, three light-emitting elements that emit light beams having red, blue, and green wavelengths, respectively, which together form white light.

For each constituent element used in the integrated light-emitting device 200, members and materials can be used that are commonly used to implement light-emitting devices employing light-emitting diodes.

(Structure of Light Guide Body Aggregate Substrate)

Figure 4A:
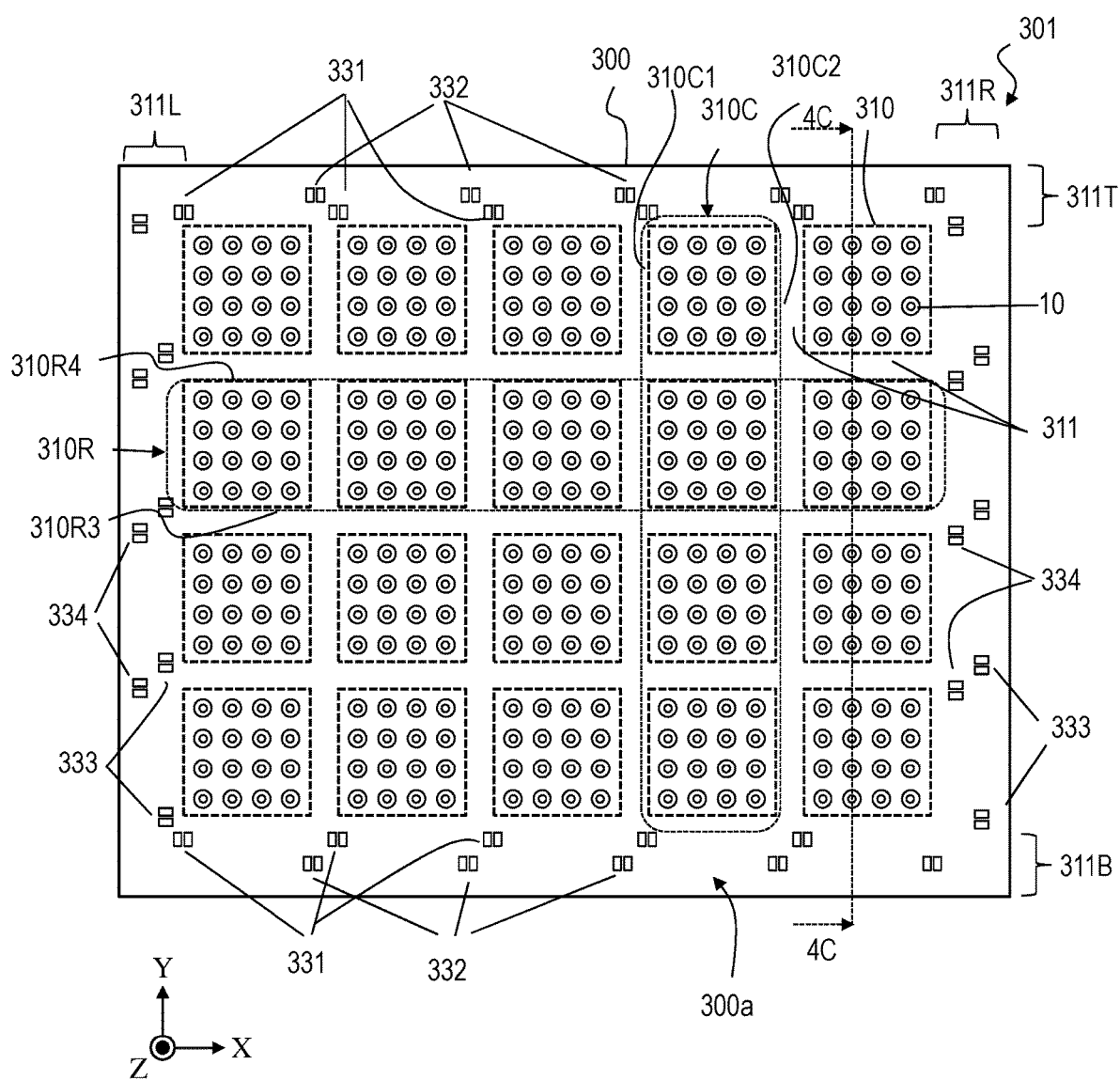
FIG. 4A is a top view showing an example light guide body aggregate substrate.
Figure 4B:
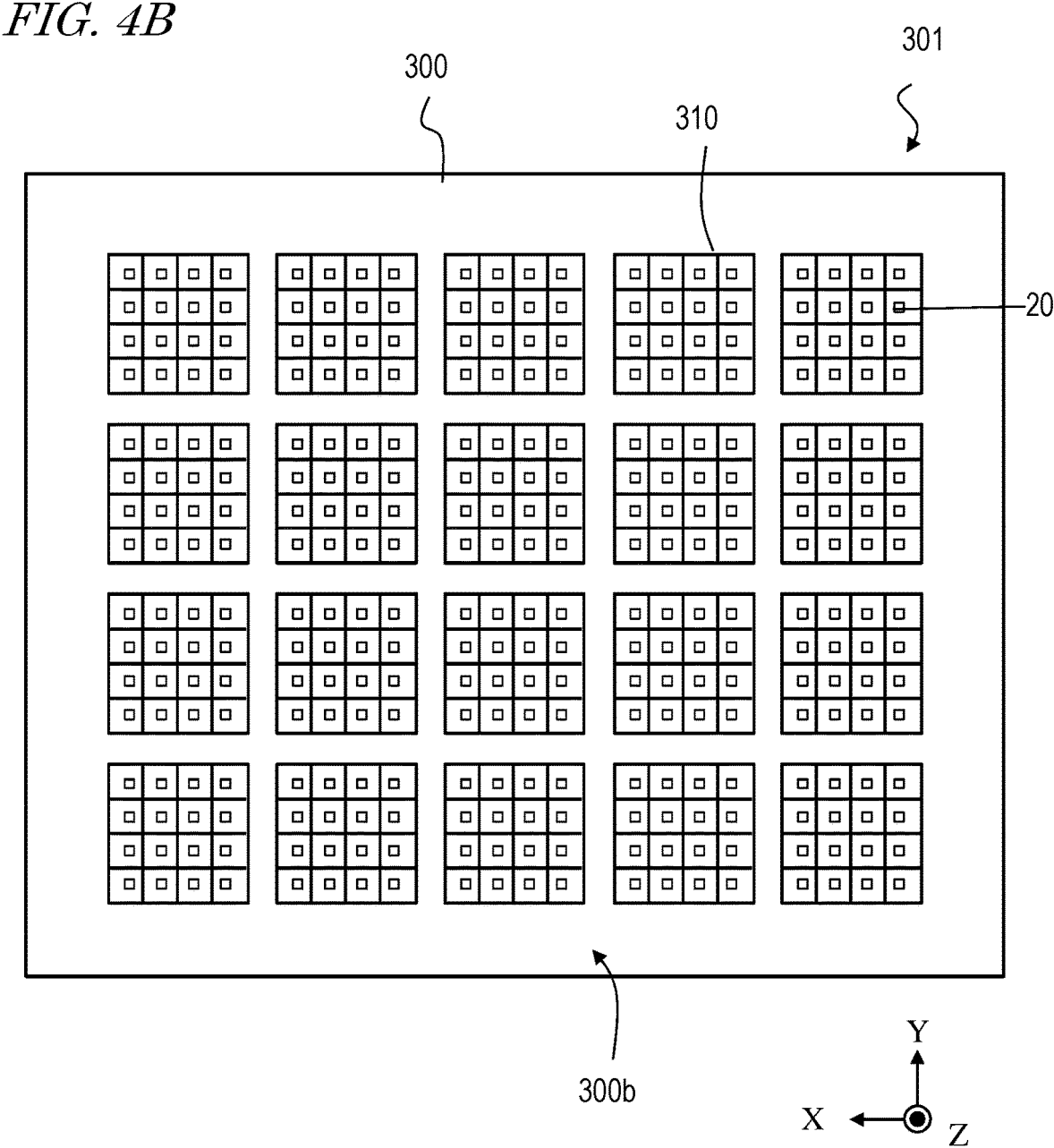
FIG. 4B is a bottom view showing an example light guide body aggregate substrate.
Figure 4C:
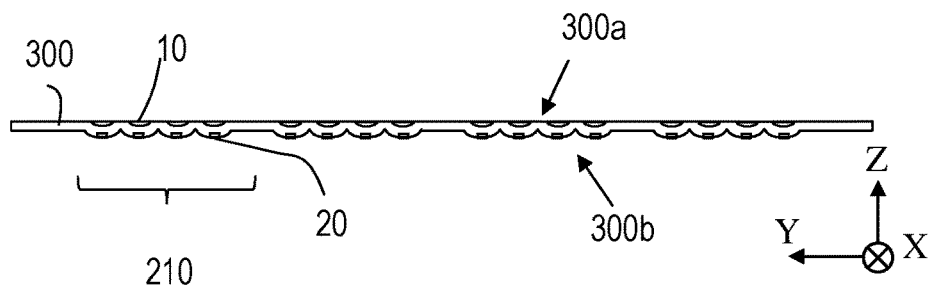
FIG. 4C is a cross-sectional view showing an example light guide body aggregate substrate.

Next, a structure of a light guide body aggregate substrate will be described. FIGS. 4A and 4B are a top view and bottom view of a light guide body aggregate substrate 301. FIG. 4C is a cross-sectional view of the light guide body aggregate substrate 301 taken along line 4C-4C of FIG. 4A.

The light guide body aggregate substrate 301 includes: a substrate 300 having a main surface 300a and a back surface 300b located on the opposite side from the main surface 300a; and a plurality of unit regions 310, a marginal region 311, and a plurality of alignment marks, which are located on the main surface 300a. The plurality of alignment marks are formed on the main surface 300a.

The substrate 300 has light-transmitting properties. The light guide bodies 210 of the plurality of integrated light-emitting devices 200 are integrally formed on the substrate 300. Specifically, a plurality of unit regions 310 are disposed on the main surface 300a of the substrate 300 and are spaced apart from each other one- or two-dimensionally. The plurality of unit regions 310 each serve as a light guide body 210 after being separated by cutting. Each unit region 310 has a light guide body structure. Specifically, as described above, the main surface 300a in each unit region 310 is the upper surface 210a of the light guide body 210, and has the first hole 10. The back surface 300b in each unit region 310 is the lower surface 210b of the light guide body 210, and has the second hole 20. Light emitted from the light-emitting element 120 disposed in the second hole 20 may be transmitted through the unit region 310, and may then be emitted from the main surface 300a including the first hole 10. Note that the correspondence between the main and back surfaces 300a and 300b of the substrate 300 and the upper and lower surfaces 210a and 210b of the light guide body 210 may be reversed. Specifically, the main surface 300a of the substrate 300 may correspond to the lower surface 210b of the light guide body 210, and the back surface 300b of the substrate 300 may correspond to the upper surface 210a of the light guide body 210. In that case, the second hole 20 is provided on the main surface 300a of the substrate 300, and the first hole 10 is provided on the back surface 300b of the substrate 300. Thus, alignment marks to be described below are provided on either the upper surface 210a or the lower surface 210b of the light guide body 210 of the integrated light-emitting device 200.

In this embodiment, the plurality of unit regions 310 are arranged in a matrix of a plurality of rows and a plurality of columns extending in the X-axis direction (first direction) and the Y-axis direction (second direction), and are two-dimensionally spaced apart from each other. Alternatively, the plurality of unit regions 310 may be arranged in a matrix of one row extending in the X-axis direction (first direction) and a plurality of columns, and may be one-dimensionally spaced apart from each other. In that case, each column includes one unit region 310. In this embodiment, a plurality of unit regions 310 are arranged in a matrix of four rows and five columns. Specifically, five columns 310C each including four unit regions 310 arranged in the Y-axis direction are arranged in the X direction. In other words, four rows 310R each including five unit regions 310 arranged in the X-axis direction are arranged in the Y direction.

As shown in FIG. 4B, when viewed from the back surface 300b of the substrate 300, the plurality of unit regions 310 are arranged in a matrix of one or a plurality of rows and a plurality of columns extending in the first and second directions, and are spaced apart from each other one- or two-dimensionally.

In the main surface 300a and the back surface 300b, the marginal region 311 is disposed around each unit region 310. In other words, the unit regions 310 are spaced apart from each other with the marginal region 311 interposed therebetween. As described below, the marginal region 311 is a cutting margin for cutting the substrate 300 and the light reflective layer 240 after the light-emitting element 120, the light reflective layer 240, etc., have been joined to the substrate 300.

A plurality of alignment marks define the positions of the plurality of unit regions 310 of the substrate 300. The light guide body aggregate substrate 301 may have a plurality of sets of alignment marks, depending on the required processing precision, or the specification or processing precision of a cutting apparatus for dicing. In this embodiment, the light guide body aggregate substrate 301 includes a plurality of first alignment marks 331, a plurality of second alignment marks 332, a plurality of third alignment marks 333, and a plurality of fourth alignment marks 334. The plurality of alignment marks are disposed in the marginal region 311. The plurality of first alignment marks 331, the plurality of second alignment marks 332, the plurality of third alignment marks 333, and the plurality of fourth alignment marks 334 are also collectively referred to as simply alignment marks 331-334.

The plurality of first alignment marks 331 are arranged in the X-axis direction. Each first alignment mark 331 is disposed on the main surface 300a at a position corresponding to the position in the X-axis direction of one of the columns 310C of the plurality of unit regions 310. Specifically, the position in the X-axis direction of one of the columns 310C indicates the position in the X-axis direction of one of a pair of sides parallel to the Y axis of the four sides of a rectangle defining the unit regions 310 included in that column 310C. In this embodiment, a first alignment mark 331 is disposed at a position corresponding to a first end 310C1 including one of two sides extending in the Y-axis direction that is closer to the origin, of the four sides of the unit regions 310 of each column 310C. As used herein, the term "correspond" means that the position of a first alignment mark 331 is determined with respect to the first end 310C1 of each column 310C under the same condition, and the first alignment mark 331 is disposed at that position. For example, the first alignment mark 331 may be disposed at the same position on the X axis as that of the first end 310C1, or may be disposed at a position a predetermined distance (e.g., 0.5 mm) away from the first end 310C1.

In this embodiment, the light guide body aggregate substrate 301 has two sets of first alignment marks 331. The two sets are disposed in regions 311T and 311B of the marginal region 311 that are located outside of the opposite ends in the Y direction of the columns 310C.

The plurality of second alignment marks 332 are arranged in the X-axis direction. Each second alignment mark 332 is disposed on the main surface 300a at a position corresponding to another position in the X-axis direction of one of the columns 310C of the plurality of unit regions 310. In this embodiment, a second alignment mark 332 is disposed at a position corresponding to a second end 310C2 including one of two sides extending in the Y-axis direction that is further from the origin, of the four sides of the unit regions 310 of each column 310C. In this embodiment, the light guide body aggregate substrate 301 has two sets of second alignment marks 332. The two sets are disposed in the regions 311T and 311B of the marginal region 311 that are located outside of the opposite ends in the Y direction of the columns 310C.

In this embodiment, the first alignment marks 331 and the second alignment marks 332 are disposed so as to form different rows in the Y-axis direction. As a result, for example, even if the marginal region 311 in the X direction of the plurality of unit regions 310 is so narrow that the first alignment marks 331 and the second alignment marks 332 cannot be disposed in a single row, the first alignment marks 331 and the second alignment marks 332 can be provided. If the marginal region 311 is wide, the first alignment marks 331 and the second alignment marks 332 may be disposed in a single row.

The plurality of third alignment marks 333 and the plurality of fourth alignment marks 334 are also disposed in a manner similar to that of the first alignment marks 331 and the second alignment marks 332, except that the third alignment marks 333 and the fourth alignment marks 334 are arranged in the Y-axis direction. Specifically, the plurality of third alignment marks 333 are arranged in the Y-axis direction. Each third alignment mark 333 is disposed on the main surface 300a at a position corresponding to the position in the Y-axis direction of one of the rows 310R of the plurality of unit regions 310. Specifically, the position in the Y-axis direction of one of the rows 310R indicates the position in the Y-axis direction of one of a pair of sides parallel to the X axis of the four sides of a rectangle defining the unit regions 310 included in that row 310R. In this embodiment, a third alignment mark 333 is disposed at a position corresponding to a third end 310R3 including one of two sides extending in the X-axis direction that is closer to the origin, of the four sides of the unit regions 310 of each row 310R. The light guide body aggregate substrate 301 has two sets of third alignment marks 333. The two sets are disposed in regions 311R and 311L of the marginal region 311 that are located outside of the opposite ends in the X direction of the rows 310R.

The plurality of fourth alignment marks 334 are arranged in the Y-axis direction. Each fourth alignment mark 334 is disposed on the main surface 300a at a position corresponding to another position in the Y-axis direction of one of the rows 310R of the plurality of unit regions 310. In this embodiment, a fourth alignment mark 334 is disposed at a position corresponding to a fourth end 310R4 including one of two sides extending in the X-axis direction that is further from the origin, of the four sides of the unit regions 310 of each row 310R.

In this embodiment, the third alignment marks 333 and the fourth alignment marks 334 are disposed so as to form different columns in the X-axis direction. However, the third alignment marks 333 and the fourth alignment marks 334 may be disposed in a single column.

The alignment marks 331-334 are formed on the main surface 300a in an optically recognizable form. For example, the alignment marks 331-334 may have a protruding shape that is protruded from the main surface 300a, or a recessed shape that is recessed from the main surface 300a. In the case of the protruding shape, the strength of the light guide body aggregate substrate can be maintained. In the case of the recessed shape, the light guide body aggregate substrate can be easily held by a sheet or the like. In both of the protruding and recessed shapes, if the side surface is sloped, a contrast difference emerges in image recognition using a device, and therefore, the alignment marks can be more easily observed and recognized. In the case of the recessed shape, a slope is preferably formed so that the area of the bottom surface of the opening is smaller than the area of the upper surface of the opening. In the case of the protruding shape, a slope is preferably formed so that the area of the upper surface of the frustum shape is smaller than the area of the bottom surface of the frustum shape. In these cases, the alignment marks 331-334 can be more easily formed. The alignment marks 331-334 may have a surface roughness different from the other regions of the main surface 300a. The alignment marks 331-334 may have a shape that is recognizable by the image recognition function of a cutting device for use in dicing. In this embodiment, the alignment marks 331-334 are each formed by two rectangles and a space therebetween. The position of the space interposed between the two rectangles is a reference to each of the alignment marks 331-334.

The light guide body aggregate substrate 301 may be produced by forming the light guide body structures of the unit regions 310 and the alignment marks 331-334 on the substrate 300 made of a light-transmitting material, such as a thermoplastic resin (e.g., an acryl, a polycarbonate, a cyclic polyolefin, polyethylene terephthalate, or a polyester), a thermosetting resin (e.g., an epoxy or a silicone), glass, or the like. For example, a mold having a shape corresponding to the light guide body structures of the unit regions 310 and the alignment marks 331-334 may be used to perform injection molding or the like so that the molding of the substrate 300 and the formation of the light guide body structures of the unit regions 310 and the alignment marks 331-334 are simultaneously performed. Alternatively, the molding of the substrate 300 and the formation of the light guide body structures of the unit regions 310 are firstly performed simultaneously by injection molding, and thereafter, the alignment marks 331-334 may be formed on the main surface 300a by laser processing or the like. As a material for the substrate 300, polycarbonates are preferably used because of their low cost and high transparency.

In the light guide body aggregate substrate 301, one of the plurality of first alignment marks 331 is disposed at a position corresponding to the position in the X-axis direction of one of the plurality of columns 310C of unit regions 310. Therefore, when a thermal treatment is performed in various steps of forming the light-emitting element 120, the light reflective layer 240, etc., on the light guide body aggregate substrate 301 to produce an aggregate of integrated light-emitting devices, then if the positions of the unit regions 310 are shifted due to the expansion and contraction of the substrate 300, the positions of the plurality of first alignment marks 331 are also similarly shifted. Therefore, by dicing the aggregate of integrated light-emitting devices with reference to the first alignment marks 331, the columns can be separated while the influence of the expansion is reduced. In addition, the light guide body aggregate substrate 301 has the second alignment marks 332 arranged in the X-axis direction, and therefore, the shift of the positions of the opposite ends in the X-axis direction of each column due to the thermal expansion is reflected by the first alignment marks 331 and the second alignment marks 332, whereby the columns can be separated while the influence of the expansion is further reduced.

Likewise, the light guide body aggregate substrate 301 has the third alignment marks 333 and the fourth alignment marks 334, and therefore, the shift of the opposite ends in the Y-axis direction of each row of unit regions 310 due to the thermal expansion is reflected by the third alignment marks 333 and the fourth alignment marks 334, whereby the rows can be separated from each other while the influence of the expansion in the Y-axis direction is reduced. As a result, the aggregate of integrated light-emitting device can be cut into pieces while the influence of the thermal expansion is reduced in the two directions. Therefore, the center of each piece obtained by cutting can coincide with the center of the light guide structure on the X-Y plane of each integrated light-emitting device, i.e., the piece and the light guide structure can be concentric or coaxial. Furthermore, the alignment marks 331-334 are disposed corresponding to the unit regions 310, and therefore, even if the light guide body aggregate substrate 301 is non-uniformly expanded, depending on the position, the center of each piece obtained by cutting can coincide with the center of the light guide structure on the X-Y plane of each integrated light-emitting device obtained by cutting, i.e., the piece and the light guide structure can be concentric or coaxial, by cutting the light guide body aggregate substrate 301 with reference to the alignment marks 331-334.

(Production Method for Integrated Light-Emitting Device)

Figure 5:
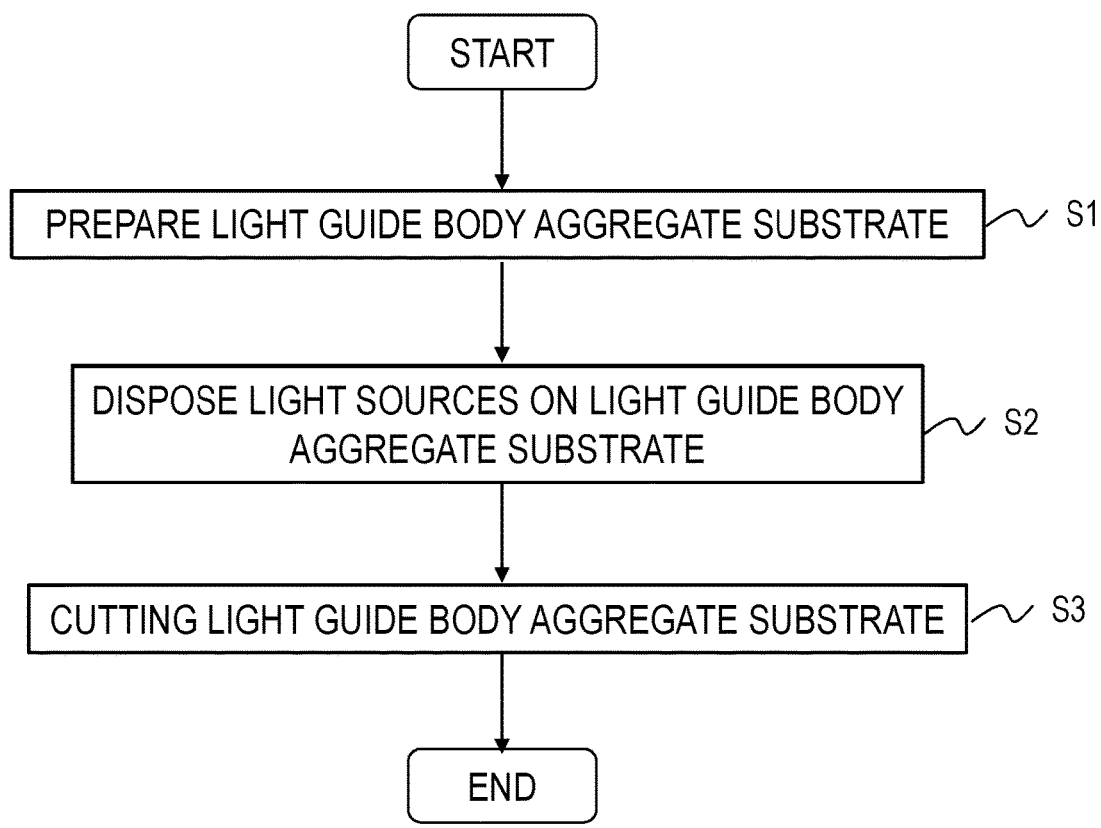
FIG. 5 is a flowchart showing an example production method for an integrated light-emitting device.

An embodiment of a production method for the integrated light-emitting device of the present disclosure will be described. FIG. 5 is a flowchart showing steps in the production method for the integrated light-emitting device. The production method for the integrated light-emitting device includes (1) a step of preparing a light guide body aggregate substrate, (2) a step of disposing a plurality of light sources on the light guide body aggregate substrate, and (3) a step of cutting the substrate. Each step will now be described in detail.

(1) Step of Preparing Light Guide Body Aggregate Substrate (S1)

Initially, a light guide body aggregate substrate 301 is prepared. For example, a light guide body aggregate substrate 301 having the shape shown in FIGS. 4A-4C is prepared. As described above, the light guide body aggregate substrate 301 in which the alignment marks 331-334 are formed on the main surface 300a of the substrate 300 and the unit regions 310 are two-dimensionally arranged on the substrate 300 is produced by injection molding or the like using a mold having a shape corresponding to the light guide body structure including the first holes 10 and the second holes 20 of the unit regions 310, and the alignment marks 331-334.

(2) Step of Disposing Plurality of Light Sources on Light Guide Body Aggregate Substrate (S2)

The light sources 160 are disposed on the light guide body aggregate substrate 301. Initially, the light sources 160 are produced. For example, a plurality of light-emitting elements 120 are two-dimensionally arranged and bonded using a light-transmitting bonding member or the like that serves as the plate-shaped wavelength conversion member 150. Thereafter, the light reflective member 170 is disposed on the wavelength conversion member 150 so as to cover the side surfaces of the light-emitting elements 120. The wavelength conversion member 150 and the light reflective member 170 are cut into pieces each including a light-emitting element 120. Thus, the light sources 160 are produced.

Next, an uncured bonding member is disposed in the second holes 20 located on the back surface 300b of the light guide body aggregate substrate 301, and the light sources 160 are disposed in the second holes 20. As a result, the bottoms of the second holes 20 face the wavelength conversion members 150, and the uncured bonding member covers the side surfaces of the wavelength conversion members 150 and the light reflective members 170, which are the side surfaces of the light sources 160. Thereafter, the uncured bonding member is cured by applying energy, such as light, heat, ultraviolet light, or the like, thereto. As a result, the light sources 160 are disposed in the unit regions 310 so that light emitted from the light-emitting elements 120 enter the unit regions 310.

Thereafter, an uncured light reflective member is disposed on the back surface 300b. In addition, an uncured reflective resin layer is disposed in the first portions 11 of the first holes 10 on the main surface 300a. Next, these uncured light reflective members are curd by applying energy, such as light, heat, ultraviolet light, or the like, thereto. As a result, the light reflective members 140 are formed on the back surface 300b. In addition, the reflective resin layer 130 is disposed in the first holes 10. Furthermore, the interconnection layer 180 that is electrically coupled to the light-emitting elements 120 is formed on the lower surfaces 140b of the light reflective members 140. As a result, a composite substrate is completed in which an integrated light-emitting device is formed in each unit region 310.

Note that, in the case in which the main surface 300a corresponds to the upper surfaces 210a of the light guide bodies 210, and in the next step (S3) of cutting the substrate, the light guide body aggregate substrate 301 is introduced into a substrate cutting apparatus with the back surface 300b facing up, it is preferable that the light reflective members 140 should not be formed in the marginal region 311 in which the alignment marks 331-334 are provided. In addition, in the case in which the main surface 300a corresponds to the lower surfaces 210b of the light guide bodies 210, and in the next step (S3) of cutting the substrate, the light guide body aggregate substrate 301 is introduced into a substrate cutting apparatus with the main surface 300a facing up, it is preferable that the light reflective members 140 should not be formed in the marginal region 311 in which the alignment marks 331-334 are provided.

In some of the above steps, the light guide body aggregate substrate 301 is subjected to a thermal treatment, which may cause the light guide body aggregate substrate 301 to expand or contract. In such a case, the unit regions 310 and the alignment marks 331-334 on the light guide body aggregate substrate 301 are moved together due to the expansion or contraction. Therefore, even if the expansion or contraction occurs, the alignment marks 331-334 are still located at positions corresponding to the first ends 310C1, second ends 310C2, third ends 310R3, and fourth ends 310R4 corresponding to the columns or rows of the unit regions 310.

(3) Step of Cleaving Substrate (S3)

Next, the light guide body aggregate substrate 301 (composite substrate) on which a plurality of integrated light-emitting devices are formed is cut into pieces, i.e., diced. The light guide body aggregate substrate 301 can be cut using a substrate cutting (separation) apparatus for a semiconductor substrate, resin substrate, etc., that is used in a production process of a semiconductor device. The cutting apparatus may be equipped with a rotary blade or linear blade.

Initially, the back surface 300b of the light guide body aggregate substrate 301 on which a plurality of integrated light-emitting devices are formed is supported using a technique suitable for the substrate cutting apparatus, such as vacuum suctioning or use of an adhesive sheet, so as to prevent the integrated light-emitting devices 200 from being moved after dicing. For example, the light guide body aggregate substrate 301 on which a plurality of integrated light-emitting devices are formed is disposed on a stage of the substrate cutting apparatus with the main surface 300a facing up. Alternatively, the light guide body aggregate substrate 301 on which a plurality of integrated light-emitting devices are formed is disposed on a stage of the substrate cutting apparatus with the back surface 300b facing up. In that case, as described above, it is preferable that the light reflective member 140 should not be formed, so that the alignment marks 331-334 can be detected by image recognition from the back surface 300b.

An image of the main surface 300a of the light guide body aggregate substrate 301 disposed on the stage is captured using an imaging apparatus for the integrated light-emitting devices, and the positions of the alignment marks 331-334 in the captured image are obtained by image recognition. The stage is optionally turned, depending on the positions of the alignment marks 331-334, so that the cutting direction is parallel to the Y axis of the light guide body aggregate substrate 301. In this embodiment, the light guide body aggregate substrate 301 has two sets of each of the first alignment marks 331, second alignment marks 332, third alignment marks 333, and fourth alignment marks 334. Therefore, a straight line connecting alignment marks located at the opposite ends of each column or row may be determined as the X axis and Y axis of the light guide body aggregate substrate 301. In the case in which the light guide body aggregate substrate 301 has a single set of each of the alignment marks 331-334, the X axis and Y axis of the light guide body aggregate substrate 301 may be determined based on the arrangement direction of each of the alignment marks 331-334.

Figure 6:
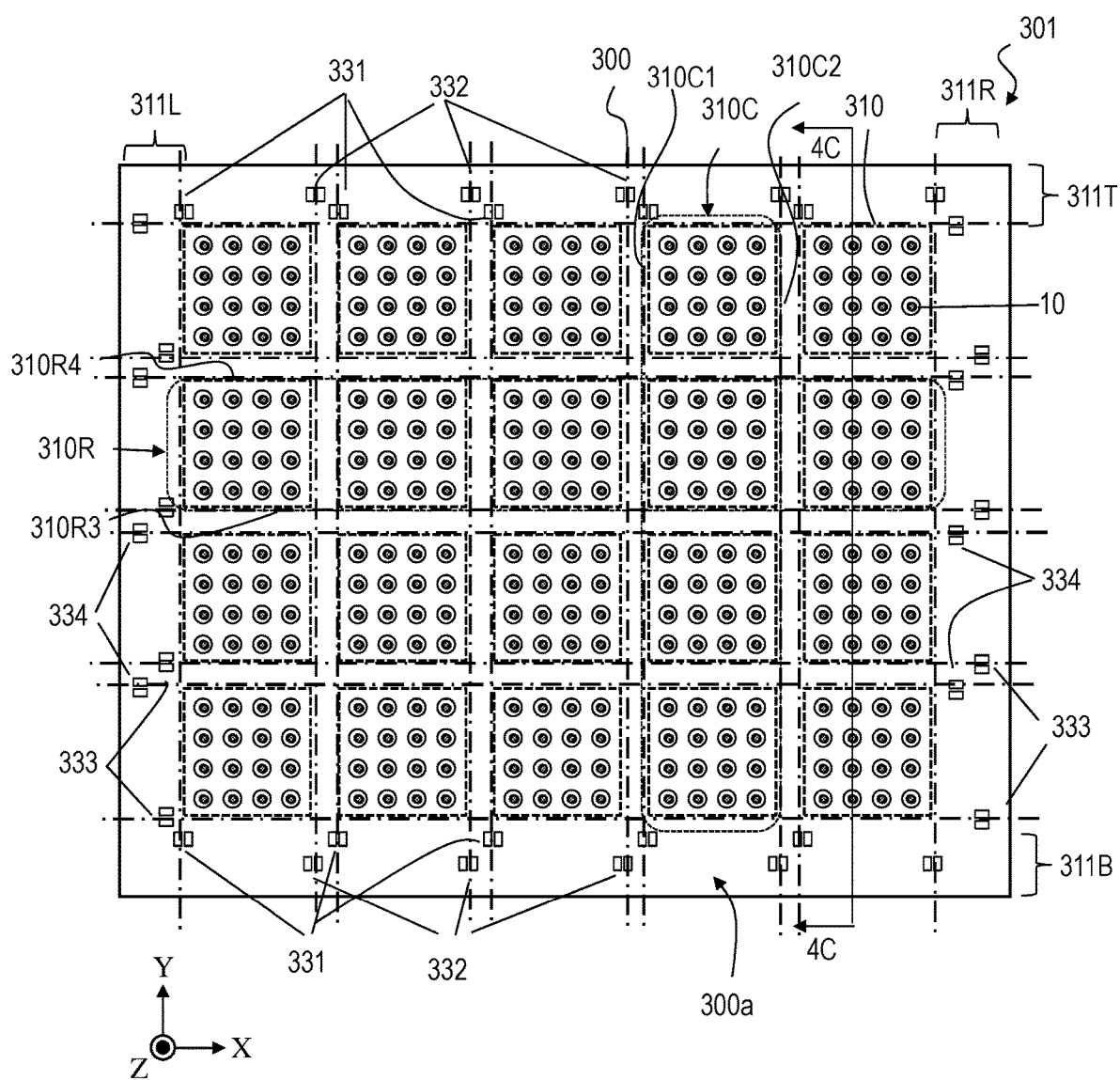
FIG. 6 is a top view showing positions where an light guide body aggregate substrate 301 is cut in a production method for an integrated light-emitting device.

As shown in FIG. 6, the light guide body aggregate substrate 301 and the light reflective layer 240 are cut in the Y-axis direction, with reference to the position of each of the plurality of first alignment marks 331, in the marginal region between a corresponding pair of adjacent ones of the plurality of columns 310C of the plurality of unit regions 310. In this embodiment, the light guide body aggregate substrate 301 also has the plurality of second alignment marks 332. The light guide body aggregate substrate 301 and the light reflective layer 240 are also cut in the Y-axis direction, with reference to the position of each of the plurality of second alignment marks 332, in the marginal region between a corresponding pair of adjacent ones of the plurality of columns 310C of the plurality of unit regions 310. As a result, the light guide body aggregate substrate 301 and the light reflective layer 240 are cut in the Y-axis direction at or near the positions of the first ends 310C1 and the second ends 310C2 in the X direction of the columns 310C of the unit regions 310.

Next, the stage is turned by 90 degrees. Thereafter, the light guide body aggregate substrate 301 and the light reflective layer 240 are cut in the X-axis direction, with reference to the position of each of the plurality of third alignment marks 333, in the marginal region between a corresponding pair of adjacent ones of the plurality of rows 310R of the plurality of unit regions 310. In this embodiment, the light guide body aggregate substrate 301 also has the plurality of fourth alignment marks 334. The light guide body aggregate substrate 301 and the light reflective layer 240 are also cut in the X-axis direction, with reference to the position of each of the plurality of fourth alignment marks 334, in the marginal region between a corresponding pair of adjacent ones of the plurality of rows 310R of the plurality of unit regions 310. As a result, the light guide body aggregate substrate 301 and the light reflective layer 240 are cut in the X-axis direction at or near the positions of the third ends 310R3 and the fourth ends 310R4 in the Y direction of the rows 310R of the unit regions 310. As a result, the light guide body aggregate substrate 301 are cut into pieces, i.e., a plurality of integrated light-emitting devices 200 are obtained.

According to the production method for the integrated light-emitting device of the present disclosure, as described above, even when the light guide body aggregate substrate 301 has expanded or contracted due to a thermal treatment in the step of disposing a plurality of light sources on the light guide body aggregate substrate, the positions of the alignment marks 331-334 on the light guide body aggregate substrate 301 correspond to the positions of the first ends 310C1, second ends 310C2, third ends 310R3, and fourth ends 310R4 of the columns or rows of the unit regions 310. Therefore, by determining the cutting positions with reference to the alignment marks 331-334, the light guide body aggregate substrate 301 can be cut into pieces while the influence of the expansion is reduced.

Other Embodiments

Figure 7:
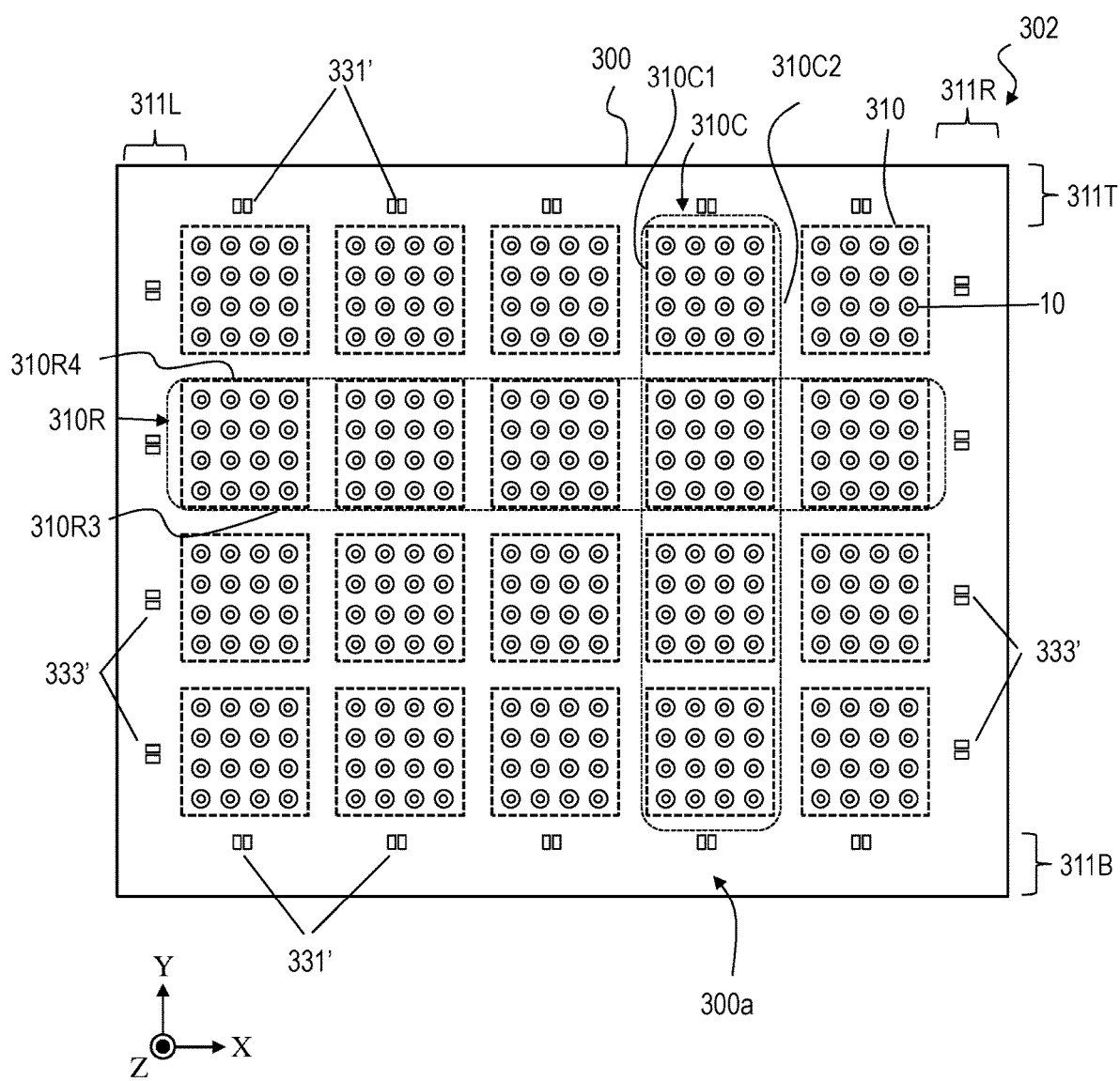
FIG. 7 is a top view showing another example light guide body aggregate substrate.

Various modifications and changes can be made to the light guide body aggregate substrate and production method for an integrated light-emitting device of the present disclosure. For example, on the light guide body aggregate substrate 301, the first alignment marks 331, second alignment marks 332, third alignment marks 333, and fourth alignment marks 334 are disposed at positions corresponding to the positions of the first ends 310C1, second ends 310C2, third ends 310R3, and fourth ends 310R4, respectively. However, an alignment mark may be disposed at a position corresponding to the positions of two ends. For example, as shown in FIG. 7, a light guide body aggregate substrate 302 may have a plurality of first alignment marks 331' and a plurality of third alignment marks 333' instead of the first alignment marks 331, second alignment marks 332, third alignment marks 333, and fourth alignment marks 334.

The plurality of first alignment marks 331' are arranged in the X-axis direction, and each of the plurality of first alignment marks 331' is disposed at a position corresponding to a center between the first end 310C1 and second end 310C2 in the X-axis direction of the corresponding column.

Likewise, the plurality of third alignment marks 333' are arranged in the Y-axis direction, and each of the plurality of third alignment marks 333' is disposed at a position corresponding to the position of a center between the third end 310R3 and fourth end 310R4 in the Y-axis direction of the corresponding row.

While the light guide body aggregate substrate 301 expands or contracts due to a thermal treatment, the space between two points that are separated a relatively short distance from each other on the light guide body aggregate substrate 301 expands or contracts in a small amount. Therefore, the amount of expansion or contraction may be negligible between the first end 310C1 and the second end 310C2 in the X-axis direction of each column 310C of unit regions 310, and between the third end 310R3 and the fourth end 310R4 in the Y-axis direction of each column 310C of unit regions 310. In that case, even when the position in the X-axis direction of each column 310C and the position in the Y-axis direction of each row 310R are each determined with reference to the position of a single kind of alignment mark, the influence of expansion and contraction can be sufficiently reduced. In the case of a single kind of alignment mark, for example, a single rectangle may be formed and an end of the rectangle may be utilized, instead of the space between the two rectangles, so that the influence of expansion and contraction can be sufficiently reduced. In the case in which such a single rectangle is used, the cutting position of the substrate cutting apparatus can be easily corrected. In addition, by disposing the alignment mark at the center of the unit region, the unit region can be provided with reference to the center of the light-emitting unit.

In the case in which integrated light-emitting devices are produced using the light guide body aggregate substrate 302, in the step (S3) of cutting the substrate the designed position where each of the columns 310C of the plurality of unit regions 310 is cut is adjusted using the position of each of the plurality of first alignment marks 331', and the light guide body aggregate substrate 302 is cut in the Y-axis direction at the adjusted positions.

After the stage is turned by 90 degrees, the designed position where each of the rows 310R of the plurality of unit regions 310 is cut is adjusted using the position of each of the plurality of third alignment marks 333', and the light guide body aggregate substrate 302 is cut in the X-axis direction at the adjusted positions.

In the case in which integrated light-emitting devices are produced using the light guide body aggregate substrate 302, the light guide body aggregate substrate 302 can be cut into pieces while the influence of the expansion of the light guide body aggregate substrate 302 is reduced.

Figure 8:
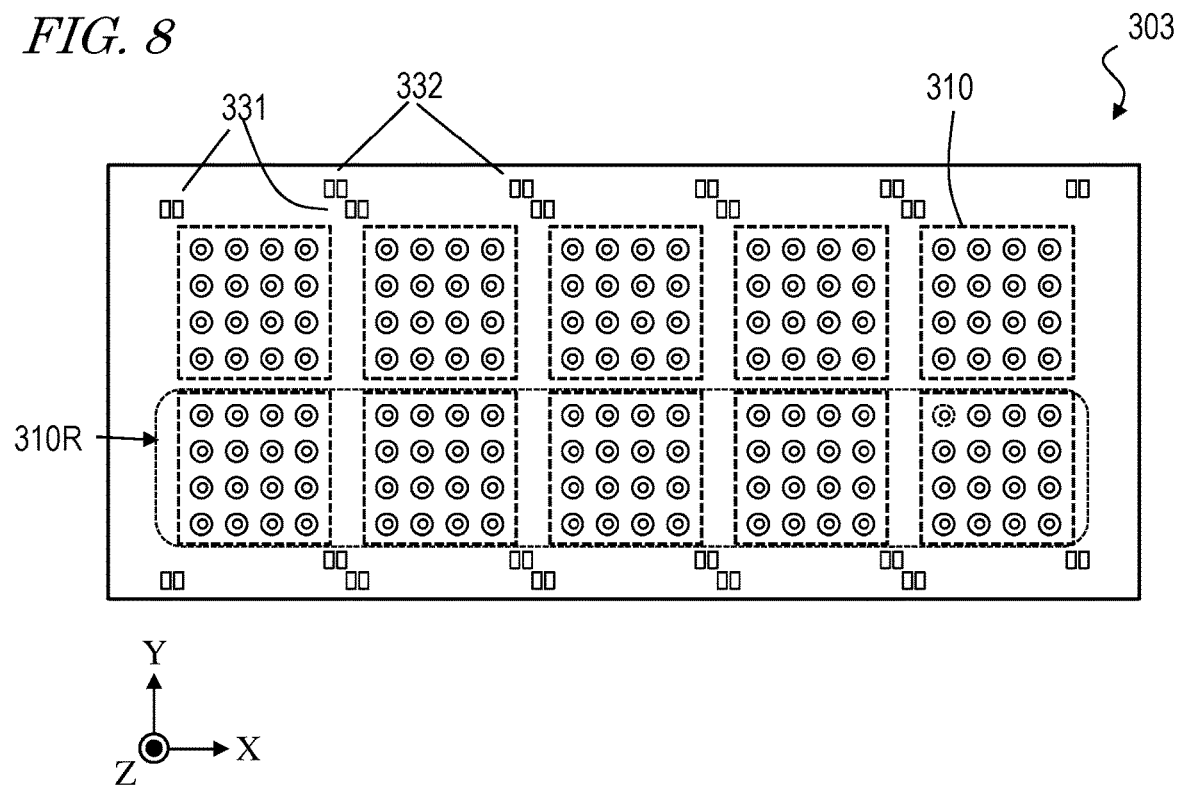
FIG. 8 is a top view showing another example light guide body aggregate substrate.
Figure 9:
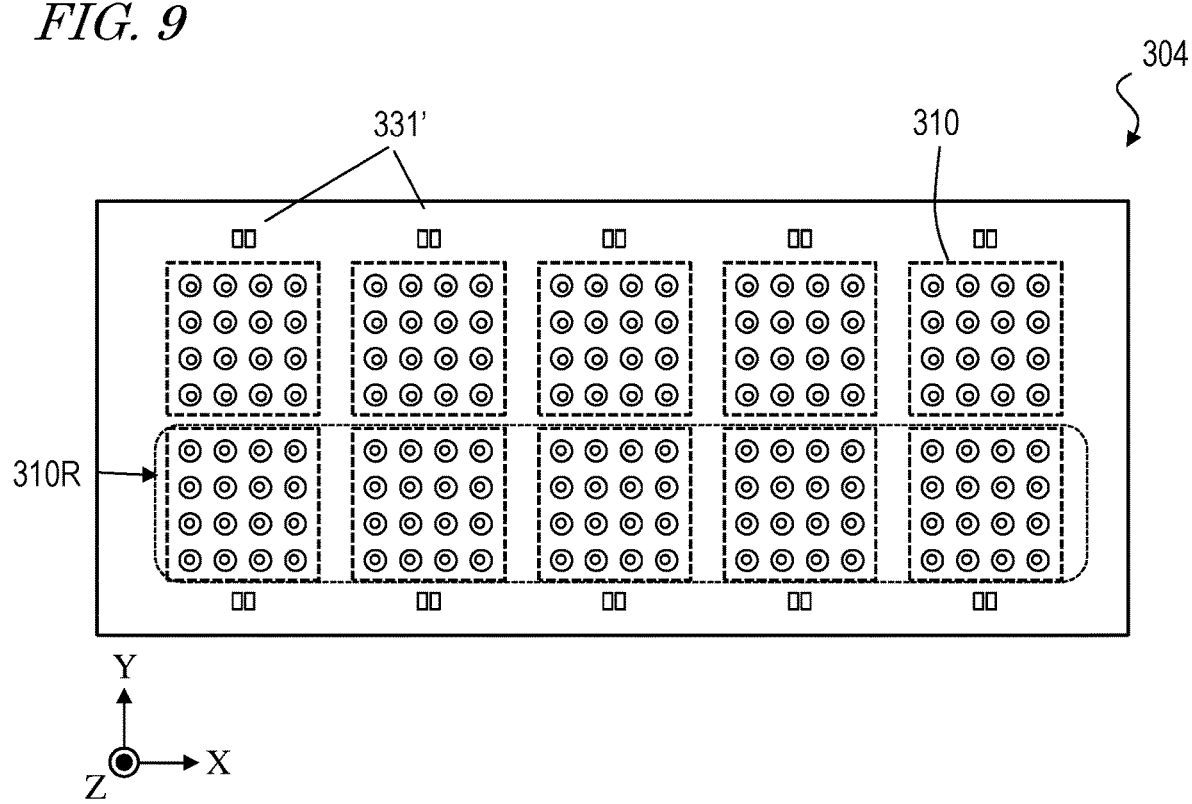
FIG. 9 is a top view showing another example light guide body aggregate substrate.

As described above, the influence of expansion or contraction due to a thermal treatment performed on the light guide body aggregate substrate increases with an increase in the distance between two points. In addition, the degree of expansion or contraction may vary depending on the shape of the light guide body 110, the method of molding the light reflective member 140 located on the lower surface 110b of light guide body, or the like. Therefore, for example, in the case in which the plurality of unit regions 310 are disposed two-dimensionally in the X-axis and Y-axis directions on the light guide body aggregate substrate, alignment marks may not be formed in a direction that the influence of expansion or contraction is small. FIG. 8 shows a light guide body aggregate substrate 303 that is different from the light guide body aggregate substrate 301 in that the light guide body aggregate substrate 303 does not have the third or fourth alignment marks, and in which the number of unit regions 310 disposed in the Y-axis direction is two. FIG. 9 shows a light guide body aggregate substrate 304 that is different from the light guide body aggregate substrate 302 in that the light guide body aggregate substrate 304 does not have the third alignment marks, and in which the number of unit regions 310 disposed in the Y-axis direction is two.

In that case, the rows 310R are separated by cutting in the X-axis direction at, for example, the center in the Y-axis direction of the light guide body aggregate substrate 303, 304, and at positions the width W in the Y-axis direction of the unit region 310 positively and negatively away from that center.

Figure 10A:
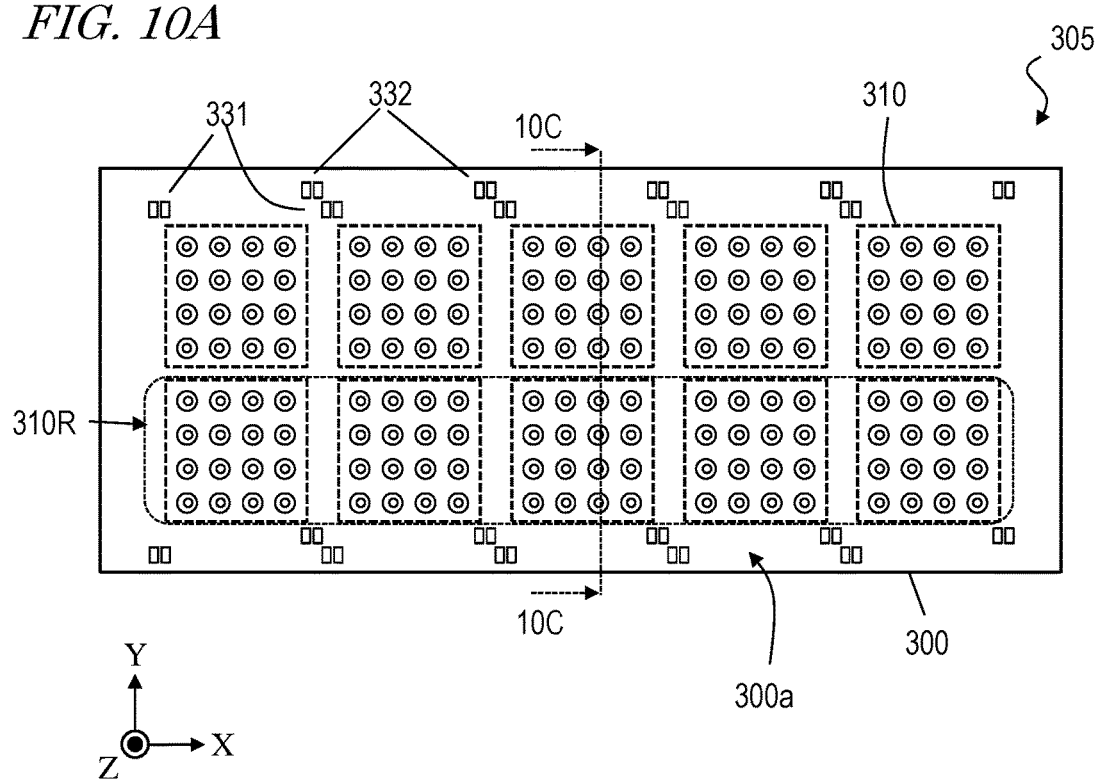
FIG. 10A is a top view showing another example light guide body aggregate substrate.
Figure 10B:
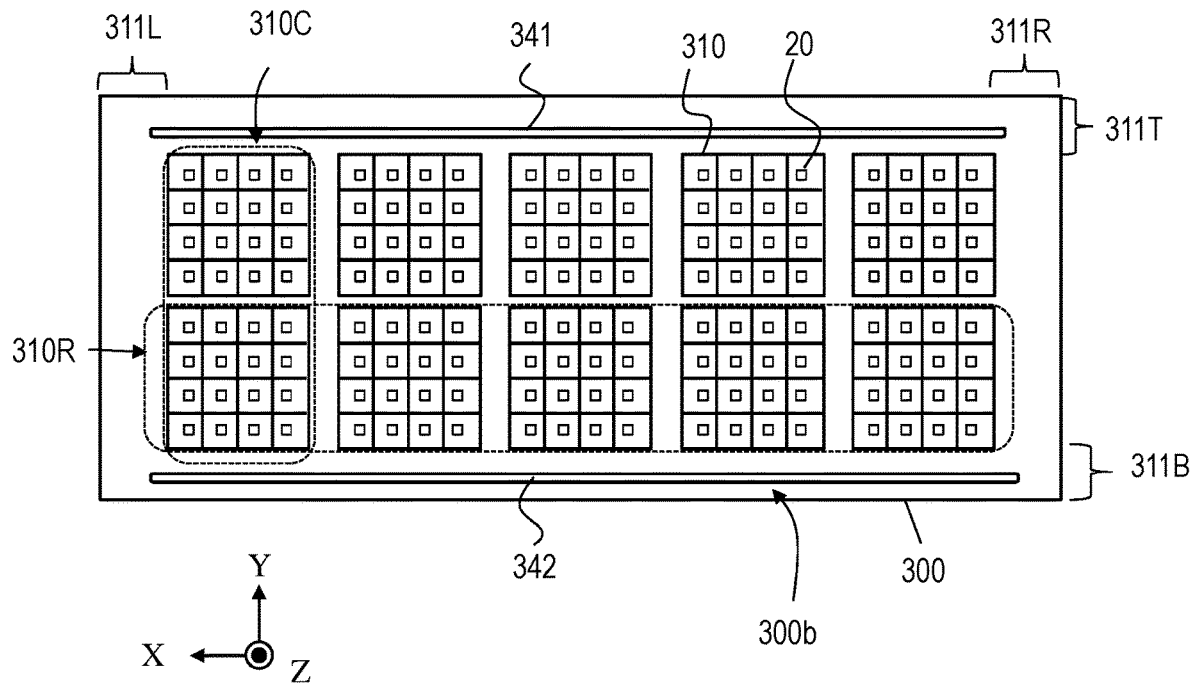
FIG. 10B is a bottom view showing another example light guide body aggregate substrate.
Figure 10C:
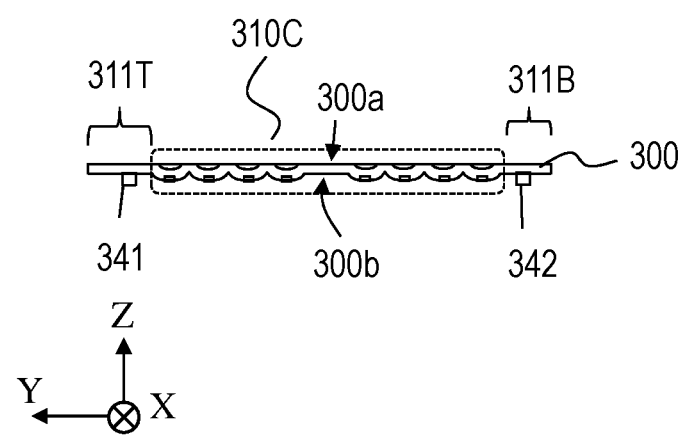
FIG. 10C is a cross-sectional view showing another example light guide body aggregate substrate.

In addition to the alignment marks, other structures may be provided on the substrate 300 of the light guide body aggregate substrate. For example, FIGS. 10A-10C show a light guide body aggregate substrate 305 that further includes ribs 341 and 342 on the substrate 300. The ribs 341 and 342 are preferably disposed on one of the main surface 300a and back surface 300b of the substrate 300 of which the light reflective member 140 is provided, i.e., the second holes 20 are provided. In the example shown in FIGS. 10A-10C, in the light guide body aggregate substrate 305, the plurality of second holes 20 are disposed on the back surface 300b of the substrate 300. Therefore, the ribs 341 and 342 are also disposed on the back surface 300b.

In FIG. 10B, specifically, the ribs 341 and 342 are disposed in regions 311T and 311B, respectively, of the marginal region 311 that are located outside of the opposite ends in the Y-axis direction of the columns 310C of the plurality of unit regions 310. In the case in which the alignment marks 331 and 332 can be detected by image recognition, the alignment marks 331 and 332 and the ribs 341 and 342 may overlap in the Z-axis direction. In the case in which the alignment marks 331 and 332 and the ribs 341 and 342 do not overlap in the Z-axis direction, the ribs 341 and 342 may be located between the alignment marks 331 and 332 and the columns 310C as viewed in the Z-axis direction, or may be located outside of the alignment marks 331 and 332. The ribs 341 and 342 protrude in the X-axis direction, and the height in the Z-axis direction thereof is substantially equal to the thickness of the light reflective member 140 formed on the back surface 300b, for example.

For example, the ribs 341 and 342 blocks the uncured light reflective member disposed on the back surface 300b of the substrate 300, which would otherwise spread during formation of the light reflective member 140. The ribs 341 and 342 are also used in order to adjust the thickness of the uncured light reflective member disposed, or adjust the thickness of the cured light reflective member, with reference to the height of the ribs 341 and 342.

Note that in the light guide body aggregate substrate 305 of FIGS. 10A-10C, the ribs 341 and 342 are disposed in the regions 311T and 311B located outside of the opposite ends in the Y direction of the columns 310C of the plurality of unit regions 310. However, a pair of ribs extending in the Y-axis direction may be disposed in regions 311L and 311R located outside of the opposite ends in the X-axis direction of the rows 310R of the plurality of unit regions 310.

Embodiments of the present disclosure are useful for various types of light sources for lighting, in-vehicle light sources, light sources for displays, etc. In particular, embodiments of the present disclosure are advantageously applicable to backlight units for liquid-crystal display devices. A light-emitting module or surface-emission light source according to an embodiment of the present disclosure can be suitably used in a backlight for the display devices of mobile devices, which heavily require a reduction in thickness, surface-emission devices on which local dimming control can be performed, etc.

While exemplary embodiments of the present invention have been described above, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A light guide body aggregate substrate comprising:
a light-transmitting substrate having a main surface;
a plurality of unit regions located at the main surface of the substrate, wherein the plurality of unit regions are spaced apart from each other, wherein the plurality of unit regions are arranged one-dimensionally in one row extending in a first direction and a plurality of columns, or arranged two-dimensionally in a plurality of rows extending in the first direction and a plurality of columns extending in a second direction, and wherein a light guide structure is located in each unit region;
a marginal region located at the main surface of the substrate, surrounding each of the plurality of unit regions; and
a plurality of first alignment marks arranged in the first direction on the substrate in the marginal region, each first alignment mark being disposed at a position corresponding to a position in the first direction of a corresponding one of the plurality of columns of the plurality of unit regions extending in the second direction.

2. The light guide body aggregate substrate according to claim 1, wherein:
each column of the plurality of unit regions has a first and a second end in the first direction, and
each of the plurality of first alignment marks is disposed at a position corresponding to a position in the first direction of the first or second end of a corresponding one of the plurality of columns.

3. The light guide body aggregate substrate according to claim 2, further comprising:
a plurality of second alignment marks arranged in the first direction on the substrate in the marginal region, each second alignment mark being disposed at a position corresponding to a position in the first direction of a corresponding one of the plurality of columns, wherein:
each of the plurality of first alignment marks is disposed at a position corresponding to a position in the first direction of the first end of a corresponding one of the plurality of columns, and
each of the plurality of second alignment marks is disposed at a position corresponding to a position in the first direction of the second end of a corresponding one of the plurality of columns.

4. The light guide body aggregate substrate according to claim 3, wherein:
the plurality of first alignment marks form a first row extending in the first direction, and the plurality of second alignment marks form a second row extending in the first direction, the second row being offset in the second direction from the first row.

5. The light guide body aggregate substrate according to claim 1, wherein:
each of the plurality of unit regions has a first and a second end in the first direction, and each of the plurality of first alignment marks is disposed at a position corresponding to a position of a center in the first direction between the first and second ends of a corresponding one of the plurality of columns.

6. The light guide body aggregate substrate according to claim 1, comprising:
two sets of the plurality of first alignment marks, the two sets being disposed in the marginal region at opposite ends, respectively, in the second direction of the plurality of columns.

7. The light guide body aggregate substrate according to claim 3, comprising:
two sets of the plurality of first alignment marks and two sets of the plurality of second alignment marks, wherein:
the two sets of plurality of first alignment marks are disposed in the marginal region at opposite ends, respectively, in the second direction of the plurality of columns, and
the two sets of plurality of second alignment marks are disposed in the marginal region at opposite ends, respectively, in the second direction of the plurality of columns.

8. The light guide body aggregate substrate according to claim 1, wherein:
the plurality of unit regions are located at the main surface of the substrate two-dimensionally in a plurality of rows extending in the first direction and a plurality of columns extending the second direction, and
the light guide body aggregate substrate further comprises:
a plurality of third alignment marks arranged in the second direction on the substrate in the marginal region, each third alignment mark being disposed at a position corresponding to a position in the second direction of a corresponding one of the plurality of rows of the plurality of unit regions extending in the first direction.

9. The light guide body aggregate substrate according to claim 8, wherein:
each row of the plurality of unit regions has a third and a fourth end in the second direction, and
each of the plurality of third alignment marks is disposed at a position corresponding to a position in the second direction of the third or fourth end of a corresponding one of the plurality of rows.

10. The light guide body aggregate substrate according to claim 9, further comprising:
a plurality of fourth alignment marks arranged in the second direction on the substrate in the marginal region, each fourth alignment mark being disposed at a position corresponding to a position in the second direction of a corresponding one of the plurality of rows, wherein:
each of the plurality of third alignment marks is disposed at a position corresponding to a position in the second direction of the third end of a corresponding one of the plurality of rows, and
each of the plurality of fourth alignment marks is disposed at a position corresponding to a position in the second direction of the fourth end of a corresponding one of the plurality of rows.

11. The light guide body aggregate substrate according to claim 8, wherein:
each of the plurality of unit regions has a third and a fourth end in the second direction, and
each of the plurality of third alignment marks is disposed at a position corresponding to a position of a center in the second direction between the third and fourth ends of a corresponding one of the plurality of rows.

12. The light guide body aggregate substrate according to claim 8, comprising:
two sets of the plurality of third alignment marks, the two sets being disposed at opposite ends, respectively, in the first direction of the plurality of rows.

13. The light guide body aggregate substrate according to claim 11, comprising:
two sets of the plurality of third alignment marks and two sets of the plurality of fourth alignment marks, wherein:
the two sets of plurality of third alignment marks are disposed in the marginal region at opposite ends, respectively, in the first direction of the plurality of columns, and
the two sets of plurality of fourth alignment marks are disposed in the marginal region at opposite ends, respectively, in the first direction of the plurality of rows.

14. A composite substrate comprising:
the light guide body aggregate substrate according to claim 1; and
a plurality of light sources disposed on the light guide body aggregate substrate, wherein:
each light source comprises one or more light-emitting elements, and
at least one light source is disposed in each respective one of the plurality of unit regions so that light emitted from the one or more light-emitting elements enters the respective light guide structure.

15. A method for producing an integrated light-emitting device, the method comprising:
preparing the light guide body aggregate substrate according to claim 1;
disposing a plurality of light sources on the light guide body aggregate substrate, wherein each light source comprises one or more light-emitting elements, and each light source being disposed for a corresponding one of the plurality of unit regions so that light emitted from the one or more light-emitting elements enters the light guide structure; and
cutting the substrate in the second direction, with reference to a position of each of the plurality of first alignment marks, in the marginal region between a corresponding pair of adjacent ones of the plurality of columns of the plurality of unit regions.

16. A method for producing an integrated light-emitting device, the method comprising:
preparing the light guide body aggregate substrate according to claim 3;
disposing a plurality of light sources on the light guide body aggregate substrate, wherein each light source comprises one or more light-emitting elements, and each light source being disposed for a corresponding one of the plurality of unit regions so that light emitted from the one or more light-emitting elements enters the light guide structure; and
cutting the substrate in the second direction, with reference to a position of each of the plurality of first alignment marks, in the marginal region at or near the first end of a corresponding one of the plurality of columns of the plurality of unit regions, and cutting the substrate in the second direction, with reference to a position of each of the plurality of second alignment marks, in the marginal region at or near the second end of a corresponding one of the plurality of columns of the plurality of unit regions.

17. A method for producing an integrated light-emitting device, the method comprising:
   preparing the light guide body aggregate substrate according to claim 5;
   disposing a plurality of light sources on the light guide body aggregate substrate, wherein each light source comprises one or more light-emitting elements, and each light source being disposed for a corresponding one of the plurality of unit regions so that light emitted from the one or more light-emitting elements enters the light guide structure; and
   adjusting a designed position at which the substrate is to be cut along each column of the plurality of unit regions, using a position of a corresponding one of the plurality of first alignment marks, and cutting the substrate in the second direction at the adjusted positions.

18. A method for producing an integrated light-emitting device, the method comprising:
   preparing the light guide body aggregate substrate according to claim 8;
   disposing a plurality of light sources on the light guide body aggregate substrate, wherein each light source comprises one or more light-emitting elements, and each light source being disposed for a corresponding one of the plurality of unit regions so that light emitted from the one or more light-emitting elements enters the light guide structure; and
   cutting the substrate in the first direction, with reference to a position of each of the plurality of third alignment marks, in the marginal region between a corresponding pair of adjacent ones of the plurality of rows of the plurality of unit regions.

19. A method for producing an integrated light-emitting device, the method comprising:
   preparing the light guide body aggregate substrate according to claim 10;
   disposing a plurality of light sources on the light guide body aggregate substrate, wherein each light source comprises one or more light-emitting elements, and each light source being disposed for a corresponding one of the plurality of unit regions so that light emitted from the one or more light-emitting elements enters the light guide structure; and
   cutting the substrate in the first direction, with reference to a position of each of the plurality of third alignment marks, in the marginal region at or near the third end of a corresponding one of the plurality of rows of the plurality of unit regions, and cutting the substrate in the first direction, with reference to a position of each of the plurality of fourth alignment marks, in the marginal region at or near the fourth end of a corresponding one of the plurality of rows of the plurality of unit regions.

20. A method for producing an integrated light-emitting device, the method comprising:
   preparing the light guide body aggregate substrate according to claim 11;
   disposing a plurality of light sources on the light guide body aggregate substrate, wherein each light source comprises one or more light-emitting elements, and each light source being disposed for a corresponding one of the plurality of unit regions so that light emitted from the one or more light-emitting elements enters the light guide structure; and
   adjusting a designed position at which the substrate is to be cut along each row of the plurality of unit regions, using a position of a corresponding one of the plurality of third alignment marks, and cutting the substrate in the first direction at the adjusted positions.

* * * * *